United States Patent [19]

Culp et al.

[11] Patent Number: 4,924,341
[45] Date of Patent: May 8, 1990

[54] TRANSIENT PROTECTOR

[75] Inventors: Norman L. Culp; Stephen C. Kwan, both of Plano, Tex.

[73] Assignee: Texas Instruments Incorporated, Dallas, Tex.

[21] Appl. No.: 183,859

[22] Filed: Apr. 20, 1988

[51] Int. Cl.⁵ .............................................. H02H 3/20
[52] U.S. Cl. ...................................... 361/56; 361/91; 307/255; 307/631
[58] Field of Search ................... 361/56, 91, 110, 111, 361/117, 118, 119; 379/331, 412; 357/38, 39; 307/630, 631, 255

[56] References Cited

U.S. PATENT DOCUMENTS

| | | | |
|---|---|---|---|
| 4,223,281 | 9/1980 | Ahmed | 307/630 X |
| 4,377,832 | 3/1983 | Toney et al. | 361/56 |
| 4,426,590 | 1/1984 | Rischmuller | 307/630 X |
| 4,484,244 | 11/1984 | Avery | 361/56 |
| 4,585,905 | 4/1986 | Brown | 361/91 X |
| 4,630,162 | 12/1986 | Bell et al. | 361/91 X |
| 4,631,567 | 12/1986 | Kokado et al. | 361/56 X |
| 4,760,439 | 7/1988 | Borkowicz | 357/39 |

Primary Examiner—Derek S. Jennings
Attorney, Agent, or Firm—Carlton H. Hoel; Thomas W. DeMond; Melvin Sharp

[57] ABSTRACT

A transient protection circuit comprising using a circuit connected to operate as a diode while presenting lower forward voltage drop for the same area and current as in pn junction diodes to provide greater efficiency. The circuit is a standard merged SCR circuit wherein a resistive path is provide between the base and collector of the pnp transistor and between the base and emitter of the npn transistor. In addition, there is provided a trip circuit wherein current is shunted away from the lateral transistor after a predetermined threshold current is passed through said transistor to minimize current drawn through the later transistor.

22 Claims, 1 Drawing Sheet

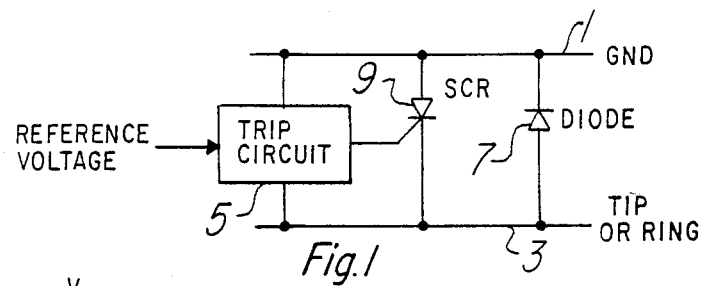
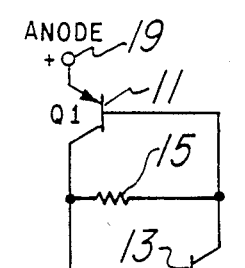
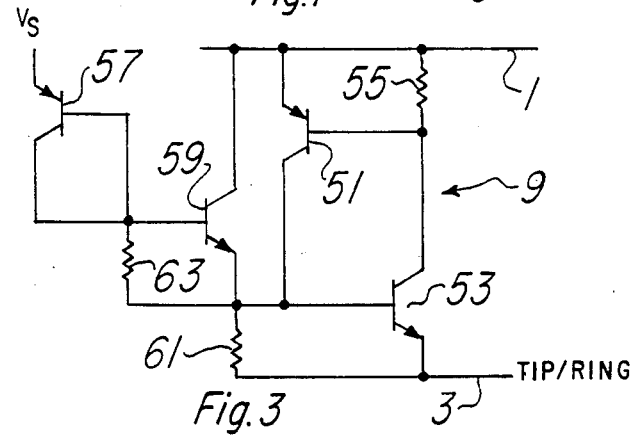
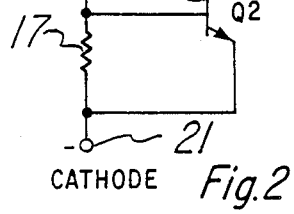
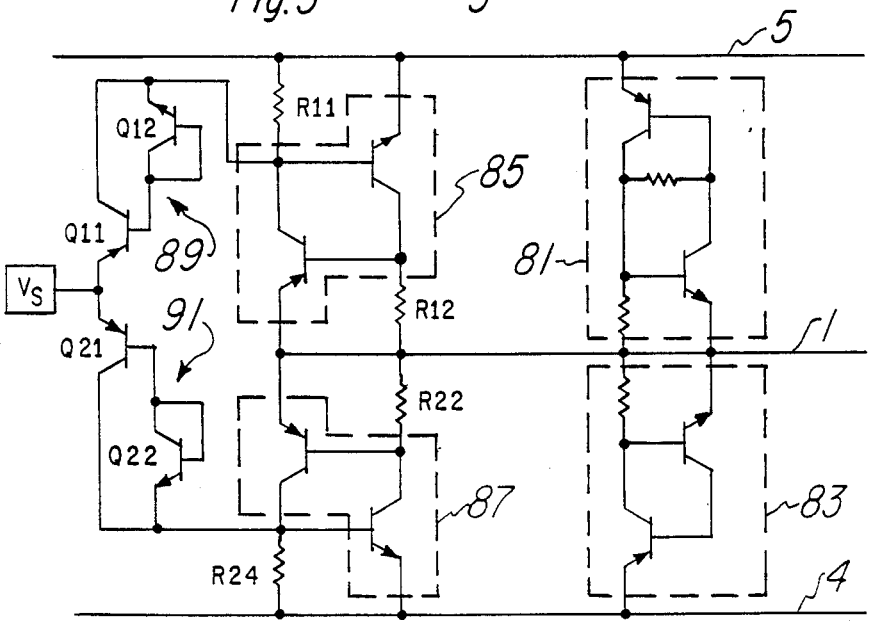

TRANSIENT PROTECTOR

BACKGROUND OF THE INVENTION

1. Field of the Invention

This invention relates to a transient protector, particularly for protection of electronic circuits from lightning strikes and, more specifically, to a system for protecting equipment at a telephone central station from damage due to lightning strikes on the external telephone lines.

2. Brief Description of the Prior Art

Devices and circuits for protection from lightning strikes and particularly such circuits for protection against lightning strikes in electronic circuits are well known in the prior art. It is known that lightning strikes can be of either positive or negative polarity relative to the reference voltage of the protected circuit. It is therefore necessary that any protection circuit be equipped to handle both positive and negative lightning strikes.

The above noted problem with lightning is especially acute in the case of telephone circuits and particularly such circuits at telephone central stations. In such circuits, the subscriber is connected to the central station, often through many miles of telephone line or cable. Lightning is often attracted to the exposed telephone lines and causes a transient, positive or negative, to travel down the line to circuits at the central station, such as, for example, the subscriber line interface circuit (SLIC), wherein such transients can burn out semiconductor circuit components therein. SLIC circuits generally include a ground line, a tip line and a ring line, both the tip and ring lines generally being negative with respect to the ground line. Circuits are located between the ground line and the tip and/or ring lines. It is therefore readily apparent that transients caused by a lightning strike can and often do travel through such circuits and cause burn out therein.

In the prior art, the above noted lightning problem has been handled by, for example, the use of a reference voltage controlled trip circuits, one such trip circuit coupled between the tip line and ground the the other trip circuit being coupled between the ring line and ground. Each trip circuit controls a separate SCR having its anode coupled to ground and its cathode coupled to the tip or ring line. In addition, diodes were coupled across the tip line and ground and across the ring line and ground with the cathode of each diode at ground. In circuits of this type, current from positive-going transients due to lightning travelled through the diode to ground whereas negative-going transients caused an increase in current travelling to the trip circuit, thereby causing the SCR to conduct when a predetermined threshold was reached, this threshold generally being the battery voltage at the central station.

Circuits of the above described type perform the function for which they are designed. However, in order to obtain semiconductor diodes capable of passing current of the magnitudes required without burning out themselves, it has been necessary that these diodes be very large and occupy a large area of the semiconductor chip. It therefore follows that chip packing density is sacrificed, this being an important consideration in semiconductor circuit design. Accordingly, it is desirable to provide circuit designs which lend themselves to greater component packing density. In addition, due to the large amounts of current potentially being drawn by such protective circuits, hot spots developed at regions of high current flow due to the voltage drop created in the diode. It is highly desirable that such hot spots be eliminated or at least minimized.

Another problem encountered with the prior art circuits is that, when the tip or ring line goes negative with respect to Vs, the central office battery voltage which is negative with respect to ground, an abnormal situation since Vs is the most negative voltage normally in the circuit, trip current will be drawn. This causes a reverse current to be drawn in the central office battery. In the prior art, a filter, such as a capacitor, has been used to support that current during transient and prevent large currents from travelling through the lateral transistor at the trip circuit. It would be highly desirable to minimize the current drawn from the battery to minimize the risk of overcurrents in the trip circuit lateral transistor, thereby minimizing and possibly eliminating the need for the filter.

SUMMARY OF THE INVENTION

In accordance with the present invention, a transient protector circuit is provided which minimizes the above problems of the prior art.

Briefly, in accordance with a first embodiment of the present invention, the diode of the prior art protector circuit is replaced by an SCR circuit which performs the diode function, yet has much greater efficiency than a p-n junction due to the conductivity modulation of the SCR, thus allowing the SCR to have a lower forward voltage drop for the same area and current. The circuit includes a pnp transistor with the emitter thereof functioning as the anode of the diode and an npn transistor with the emitter thereof functioning as the cathode. The pnp transistor base is coupled directly to the npn transistor collector and to the npn transistor base through a first resistor. The pnp transistor collector is coupled directly to the npn transistor base, the latter being coupled to the cathode via a second resistor.

In accordance with a second embodiment of the invention, the trip circuit for the SCR of the prior art protector circuit is modified to avoid large currents in the lateral transistor thereof. This circuit includes the prior art circuit which includes a pnp lateral transistor having its emitter coupled to the battery Vs and its base and collector coupled together and to the tip or ring line via a first resistor. The additional circuit components are provided to shift large currents to an alternate circuit path, these components including a second resistor in series with the first resistor and the pnp transistor base. Also provided is a second npn transistor having its base coupled to the base of the first transistor, the collector coupled to the ground line and the emitter coupled to the junction of the first and second resistors. In this way, transient current travels through the first transistor alone until the voltage across the first resistor turns on the second transistor, whereupon all further current is drawn through the second transistor.

BRIEF DESCRIPTION OF THE DRAWINGS

FIG. 1 is a block diagram of a typical prior art transient protector circuit;

FIG. 2 is a circuit diagram of a circuit for providing a diode function in accordance with the present invention;

FIG. 3 is an SCR trip circuit in accordance with the present invention; and

FIG. 4 is a circuit diagram of a SLIC circuit using the protector circuit in accordance with the present invention.

DESCRIPTION OF THE PREFERRED EMBODIMENT

Referring now to FIG. 1, there is shown a typical prior art SLIC protection circuit for transient protection circuit for use in SLIC circuits at telephone central stations. The circuit includes a ground line 1 at one reference voltage and a tip or ring line 3 which is generally negative with respect to the ground line, it being understood that a ring or tip line is provided which is a mirror image of line 3 with respect to the ground line. Accordingly, all discussions herein relative to a tip line 3 apply as well to the ring line (not shown in FIG. 1). The circuit of FIG. 1 provides protection against both positive and negative transients with respect to ground to include all possible forms of lightning transients.

The circuit includes a trip circuit 5 coupled between the ground line 1 and the tip line 3 and controlled by Vs, another reference voltage derived from a battery at the central station which is normally at a more negative voltage than the tip line. A diode 7 in the form of a p-n junction type semiconductor device is coupled between the ground line 1 and the tip line 3 with its anode coupled to the tip line and its cathode coupled to the ground line. In this manner, the diode 7 will shunt current directly to ground when large positive with respect to ground voltage transients appear on the tip line 3. The circuit also includes an SCR 9 having a gate electrode coupled to and controlled by the trip circuit 5. The anode of the SCR is coupled to the ground line 1 and the cathode thereof is coupled to the tip line 3.

For negative with respect to ground voltage transients on the tip line 3, it is desirable that the protective circuit not come into operation until the voltage of the tip line goes negative relative to the battery Vs at the central station to prevent or avoid reverse current in the battery. Under this condition, the diode 7 is reverse biased. Current will flow from the reference voltage source Vs until a predetermined current level has been reached in the trip circuit whereupon the trip circuit will fire the SCR 9 and provide a current path for the current away from the SLIC circuit, thereby providing the required protection for both positive and negative transients.

Referring now to FIG. 2, there is shown a circuit for use in place of the diode 7 which has large current capability relative to a p-n junction diode and therefore can be formed in less space for the same current carrying capacity with diminished forward voltage drop in power dissipation. The circuit includes a pnp transistor 11 with the emitter thereof functioning as the anode 19 of the diode and an npn transistor 13 with the emitter thereof functioning as the cathode. The pnp transistor base is coupled directly to the npn transistor collector and to the npn transistor base through a first resistor 15. The pnp transistor collector is coupled directly to the npn transistor base, the latter being coupled to the cathode 21 via a second resistor 17.

In operation, as positive voltage is applied to the anode 19 relative to the cathode 21, the base-emitter junction of transistor 11 becomes forward biased and the circuit appears as a diode in series with resistors 15 and 17 at that time. As the current in the circuit of the base-emitter of transistor 11 and resistors 15 and 17 increases, the voltage across resistor 17 increases and eventually, when the voltage across resistor 17 is sufficiently high, turns on transistor 13. At this time. transistor 11 will also turn to provide the low impedance path through transistor 11 and resistor 17 to the cathode. The circuit will continue to conduct in this manner until the voltage across resistor 17 is below the threshold voltage for transistor 13.

Referring now to FIG. 3, there is shown a preferred embodiment of an SCR trip circuit for control of the SCR 9 of FIG. 1. The SCR 9 is provided in the form of a pnp transistor 51 and an npn transistor 53 with resistor 55 in standard manner. The gate of transistor 53 corresponds to the gate of the SCR 9 of FIG. 1. The trip circuit for the SCR of the prior art protector circuit is modified to avoid large currents in the lateral transistor 57 thereof. This circuit includes the prior art circuit which includes pnp lateral transistor 57 having its emitter coupled to the battery Vs and its base and collector coupled together and to the tip or ring line 3 via a first resistor 61. The additional circuit components are provided to shift the excess of large currents to an alternate circuit path, these components including a second resistor 63 in series with the first resistor 61 and the pnp transistor 57 base. Also provided is a second npn transistor 59 having its base coupled to the base of the first transistor 57, the collector thereof being coupled to the ground line 1 and the emitter thereof coupled to the junction of the first and second resistors 61 and 63. In this way, transient current travels through the first transistor 57 alone until the voltage across the second resistor 63 turns on the transistor 59, whereupon all further current is drawn through the second transistor 59. Resistor 63 must be small enough to prevent transistor 59 from conducting with a predetermined amount of current. The SCR 9 is turned on when the voltage across resistor 61 reaches the appropriate threshold as is well known to provide an effective short circuit across lines 1 and 3. The SCR is turned off when the holding current through resistor 61 is insufficient to maintain the SCR on.

Referring now to FIG. 4, there is shown a schematic diagram of an actual SLIC transient protection circuit utilizing the features in accordance with the present invention. As can be seen the circuit includes the ground line 1, the tip line 3 and the ring line 4. the circuits denoted as 81 and 83 are diode circuits of the type set forth in FIG. 2. The circuits denoted as 85 and 87 are SCR circuits of the type shown as 9 in FIG. 3 and the circuits denoted as 89 and 91 are the trip circuit as shown in FIG. 3.

Though the invention has been described with respect to specific preferred embodiments thereof, many variations and modifications will immediately become apparent to those skilled in the art. It is therefore the intention that the appended claims be interpreted as broadly as possible in view of the prior art to include all such variations and modifications.

We claim:

1. A transient protection circuit which comprises,
   (a) a pair of electrical lines, each said line normally being at different voltage levels, one of said lines being at a reference voltage;
   (b) a unidirectional semiconductor device comprising a pnp transistor having an emitter electrode coupled to the first of said lines and an npn transistor having an emitter electrode coupled to the second of said lines, the control electrode of said pnp transistor being coupled to the collector electrode of said npn transistor and the collector electrode of said pnp transistor being coupled to the control electrode of said npn transistor, resistive means coupling the control electrode and the collector electrodes of said pnp transistor and resistive means coupling the control electrode and the emitter electrode of said npn transistor;

(c) a controlled rectifier circuit having an anode, a cathode and a control electrode, said anode being coupled to the second of said lines and said cathode coupled to the first of said lines; and (d) circuit means controlling operation of said controlled rectifier.

2. A unidirectional circuit device comprising:
a pnp transistor having an emitter electrode and an npn transistor having an emitter electrode, a control electrode of said pnp transistor coupled to a collector electrode of said npn transistor, a collector electrode of said pnp transistor coupled to a control electrode of said npn transistor, resistive means coupling said control electrode and said collector electrode of said pnp transistor and resistive means coupling said control electrode and said emitter electrode of said npn transistor.

3. A unidirectional circuit device comprising:
(a) a first semiconductor device having a control electrode of a predetermined conductivity type, said control electrode controlling the conductance of a current path between a first and second electrode of said first semiconductor device;

(b) a second semiconductor device having a second control electrode of a conductivity type different than said predetermined conductivity type and coupled to said second electrode of said first semiconductor device, said control electrode of said second semiconductor device controlling the conductance of a current path between a first and second electrode of said second semiconductor device;

(c) first resistive means coupled between said control electrode and said second electrode of said first semiconductor device, said control electrode of said first semiconductor device coupled to said first electrode of said second semiconductor device; and (d) second resistive means coupled between said second control electrode and said second electrode of said second semiconductor device.

4. The circuit of claim 3, wherein said first and second resistive means comprise resistors.

5. A transient protection circuit, comprising:
(a) first and second electrical lines, said lines normally being at different voltage levels, said second line being at a reference voltage;

(b) a unidirectional semiconductor device having an anode coupled to said first line and a cathode coupled to said second line, said unidirectional semiconductor device comprising a pnp transistor having an emitter electrode coupled to said first line and an npn transistor having an emitter electrode coupled to said second line, a control electrode of said pnp transistor coupled to a collector electrode of said npn transistor and a collector electrode of said pnp transistor coupled to a control electrode of said npn transistor, resistive means coupling said control electrode and said collector electrode of said pnp transistor and resistive means coupling said control electrode and said emitter electrode of said npn transistor;

(c) a rectifier circuit having a rectifier anode, a rectifier cathode and a rectifier control electrode, said rectifier anode coupled to said second line and said rectifier cathode coupled to said first line; and (d) a control circuit for controlling operation of said rectifier circuit including a first semiconductor device having a first control electrode and a first current path coupled between said rectifier control electrode and said second line, biasing means coupled between said rectifier control electrode and said rectifier cathode, a second semiconductor device having a second current path coupled between a predetermined voltage level and said first line, and responsive to a voltage level in said first line different than said predetermined voltage level to conduct current in said second current path, and means responsive to a predetermined threshold current in said second current path of said second semiconductor device to conduct current in said first current path of said first semiconductor device, said first current path operable to shunt current from said second line to said first line such that large amounts of current are prevented in said second current path.

6. A transient protection circuit, comprising:
(a) first and second electrical lines, said lines normally being at different voltage levels, said second line being at a reference voltage;

(b) a unidirectional semiconductor device having an anode coupled to said first line and a cathode coupled to said second line, said unidirectional semiconductor device comprising a pnp transistor having an emitter electrode coupled to said first line and an npn transistor having an emitter electrode coupled to said second line, a control electrode of said pnp transistor coupled to a collector electrode of said npn transistor and a collector electrode of said pnp transistor coupled to a control electrode of said npn transistor, resistive means coupling said control electrode and said collector electrode of said pnp transistor and resistive means coupling said control electrode and said emitter electrode of said npn transistor;

(c) a rectifier circuit having a rectifier anode, a rectifier cathode and a rectifier control electrode, said rectifier anode coupled to said second line and said rectifier cathode coupled to said first line; and (d) a control circuit for controlling operation of said rectifier including a first semiconductor device having a first control electrode and a first current path coupled between said rectifier control electrode and said second line, resistive means coupled to said rectifier control electrode and said rectifier cathode, a second semiconductor device having a second current path and responsive to a predetermined condition to conduct current in said second current path and means responsive to a predetermined threshold current in said second current path of said second semiconductor device to conduct current in said first current path of said first semiconductor device, said first current path operable to shunt current from said second line to said first line such that large amounts of current are prevented in said second current path.

7. A transient protection circuit, comprising:
(a) first and second electrical lines, said lines normally being at different voltage levels, said second line being at a reference voltage;

(b) a unidirectional semiconductor device having an anode coupled to said first electrical line and a cathode coupled to said second line, said unidirectional semiconductor device comprising a pnp transistor having an emitter electrode coupled to said first line and an npn transistor having an emitter electrode coupled to said second line, a control electrode of said pnp transistor coupled to a collector electrode of said npn transistor and a collector electrode of said pnp transistor coupled to a control electrode of said npn transistor, resistive means coupling said control electrode and said collector electrode of said pnp transistor and resistive means coupling said control electrode and said emitter electrode of said npn transistor;

(c) a rectifier circuit having a rectifier anode, a rectifier cathode and a rectifier control electrode, said rectifier anode coupled to said second line and said rectifier cathode coupled to said first line; and (d) a control circuit for controlling operation of said rectifier circuit including a npn semiconductor device having a first control electrode and a first current path coupled between said rectifier control electrode and said second line, resistive means coupled to said rectifier control electrode and said rectifier cathode, a pnp semiconductor device having a second current path coupled between a predetermined voltage level and said first line, and responsive to a voltage level in said first line different than said predetermined voltage level to conduct current in said second current path and resistive means coupled between said first control electrode of said npn semiconductor device and said rectifier control electrode, said resistive means responsive to a predetermined threshold current in said second current path of said pnp semiconductor device to conduct current in said first current path of said npn semiconductor device, said first current path operable to shunt current from said second electrical line to said first electrical line such that large amounts of current are prevented in said second current path.

8. A transient protection circuit which comprises:

(a) first and second electrical lines, said lines normally being at different voltage levels, said second line being at a reference voltage;

(b) a unidirectional semiconductor device having an anode coupled to said first line and a cathode coupled to said second line;

(c) a rectifier circuit having a rectifier anode, a rectifier cathode and a rectifier control electrode, said rectifier anode coupled to said second line and said rectifier cathode coupled to said first line; and (d) a control circuit for controlling operation of said rectifier including a first semiconductor device having a first control electrode, a current path of said first semiconductor device coupled between said rectifier control electrode and said second line, biasing means coupled between said rectifier control electrode and said rectifier cathode, a second semiconductor device of said control circuit having a current path coupled between a predetermined voltage level and said first line, said second semiconductor device responsive to a voltage level in said first line different than said predetermined voltage level to conduct current in said current path thereof, means responsive to a predetermined threshold current in said current path of said second semiconductor device to conduct current in said current path of said first semiconductor device, said current path of said first semiconductor device operable to shunt current from said second line to said first line such that large amounts of current are prevented in said current path of said second semiconductor device.

9. A circuit as set forth in claim 1 wherein said controlled rectifier circuit comprises a silicon controlled rectifier.

10. A circuit as set forth in claim 1 wherein said first semiconductor device is an npn device and said second semiconductor device is a pnp device.

11. A circuit as set forth in claim 1 wherein said biasing means includes resistive means coupled between said rectifier control electrode and said rectifier cathode of said rectifier.

12. A circuit as set forth in claim 10 wherein said biasing means includes resistive means coupled between said rectifier control electrode and said rectifier cathode of said rectifier.

13. A circuit as set forth in claim 1 wherein said means responsive, includes resistive means coupled between said first control electrode of said first semiconductor device and said rectifier control electrode of said controlled rectifier.

14. A circuit as set forth in claim 11 wherein said means responsive includes resistive means coupled between said first control electrode of said first semiconductor device and said rectifier control electrode of said controlled rectifier.

15. A circuit as set forth in claim 12 wherein said means responsive is resistive means coupled between said first control electrode of said first semiconductor device and said rectifier control electrode of said controlled rectifier.

16. The circuit of claim 11, wherein said resistive means comprises a resistor.

17. The circuit of claim 12, wherein said resistive means comprises a resistor.

18. The circuit of claim 13, wherein said resistive means comprises a resistor.

19. The circuit of claim 14, wherein said resistive means comprises a resistor.

20. The circuit of claim 15 wherein said resistive means comprises a resistor.

21. The circuit of claim 18, wherein a voltage drop caused by current flowing through said resistor causes said first semiconductor device to conduct electricity in said current path thereof.

22. The circuit of claim 19, wherein a voltage drop caused by current flowing through said resistor causes said first semiconductor device to conduct electricity in said current path thereof.

* * * * *